United States Patent [19]
LaRussa

[11] Patent Number: 4,717,248
[45] Date of Patent: Jan. 5, 1988

[54] DISPLAY SYSTEM

[76] Inventor: Joseph LaRussa, 451 Rutledge Dr., Yorktown Hgts., N.Y. 10598

[21] Appl. No.: 783,654

[22] Filed: Oct. 3, 1985

[51] Int. Cl.⁴ .......................... G02B 7/18; G02B 27/14
[52] U.S. Cl. ..................... 350/618; 340/705; 350/174; 350/619; 350/625
[58] Field of Search ........ 350/618, 619, 620, 624–627, 350/174, 123, 170, 171; 340/705

[56] References Cited

U.S. PATENT DOCUMENTS

| | | | |
|---|---|---|---|
| 3,536,832 | 10/1970 | Zipse et al. | 350/632 X |
| 3,549,803 | 12/1970 | Becht et al. | 350/174 X |
| 3,620,592 | 11/1971 | Freeman | 350/174 X |
| 3,697,154 | 10/1972 | Johnson | 350/174 |
| 3,719,817 | 3/1973 | McCoy et al. | 350/174 X |
| 3,723,805 | 3/1973 | Scarpino et al. | 350/174 X |
| 3,738,733 | 6/1973 | Pettit | 350/174 |
| 3,784,742 | 1/1974 | Burnham et al. | 350/174 X |
| 3,848,974 | 11/1974 | Hosking et al. | 350/174 |
| 3,923,370 | 12/1975 | Mostrom | 350/619 |
| 3,940,204 | 2/1976 | Withrington | 350/174 X |
| 4,257,677 | 3/1981 | Anderson | 350/618 X |
| 4,490,745 | 12/1984 | Erickson et al. | 350/174 X |

*Primary Examiner*—John Petrakes
*Attorney, Agent, or Firm*—Handal & Morofsky

[57] ABSTRACT

This system is designed for video displays that are used for television presentation or film projection, so as to reduce eyestrain, glare from light reflections, and will increase contrast and apparent brightness, making the presentations more readable, and will reduce all potentially harmful radiation effects from the cathode ray tube, which may be cumulative. Primarily, the system consists of an elevated cathode ray tube in the display housing, which produces its image on an inner frontal plane mirror where the image is projected onto and inner spherical morror that reflects the image through a housing cover glass to be seen by the user.

4 Claims, 5 Drawing Figures

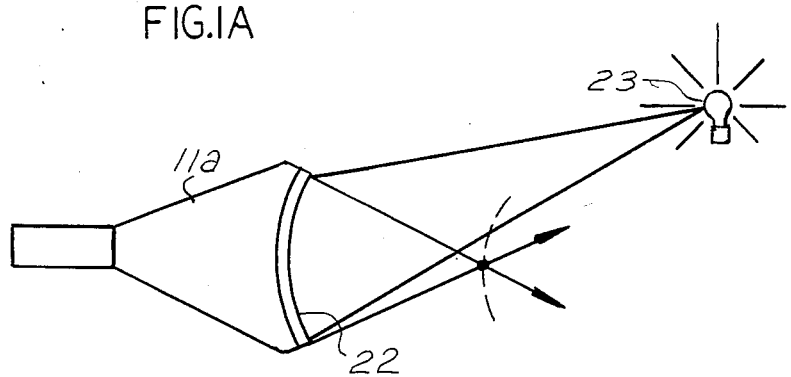
FIG.IA
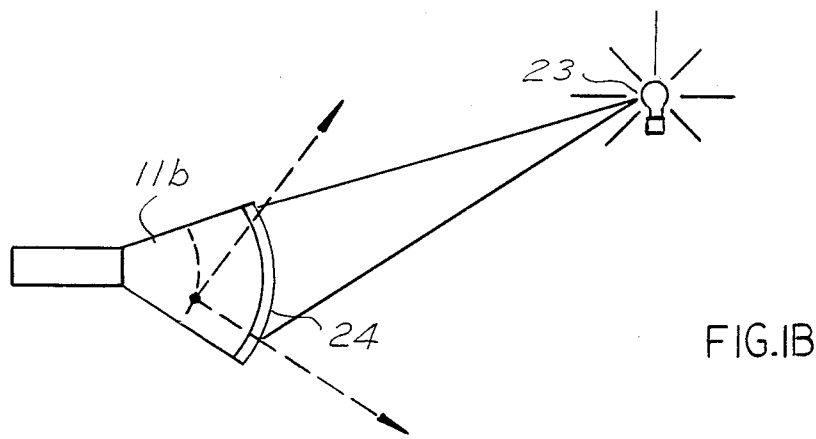
FIG.IB
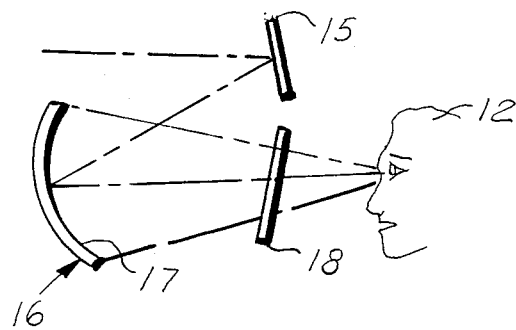
FIG.IC

DISPLAY SYSTEM

BACKGROUND OF THE INVENTION

1. Field of the Invention

This invention relates to video display devices, and more particularly, to a display system.

2. Description of Prior Art

A reference of record is the Burnham et al, U.S. Pat. No. 3,784,742. Cathode ray tubes have face plates which are spherically shaped, and as such, are prone to reflect all ambient room illumination that exists in the frontal hemisphere. This by itself dilutes the brightness of the display and reduces the contrast, thus making the display less readable and causing considerable eyestrain. Additionally, reflections off the face of the CRT of all bright objects in the vicinity, cause added visual confusion contributing to eyestrain and fatigue. Recently, special face plates have been devised as covers for the CRT's. Such covers or dark covers made of anti-reflection polaroid or of polaroid-quarter waveplate sandwiches do reduce glare, but they also dim the display so that little gain, if any, is made in readability. Special glare reducing spectacles are also available for each color video display terminal or (VDT's) associated with all types of computers, but these devices must be prescription ground for each individual observer, and they do not overcome the problems of fatigue and eyestrain due to close viewing, nor do they avoid cumulative effects of electron radiation from the CRT. Other disadvantages of current VDT's are the concentration required by the operator at a close viewing distance (approximately fourteen inches) leading to fatigue in viewing, blurred vision, eye irritation, tearing, headaches, etc., and most recently discovered, electron radiation effects from the CRT, which may be cumulative and harmful after long exposures. The display system in accordance with the present invention, will avoid all of the aforementioned disadvantages of available VDT's through the use of an indirect viewing optical system.

The principal object of this invention is to provide a display system, which will be unique for employment in viewing either television presentations or film projection, by reducing eyestrain and glare from light reflections, and by increasing contrast and apparent brightness, making the presentation more readable.

Another object of this invention is to provide a display system, which will be employed to substantially reduce all harmful radiation effects from the electrode or cathode ray tube, to insignificant levels, as video display terminal operators are presently subjected to electron radiation which may be cumulative and harmful after long exposures thereto.

A further object of this invention is to provide a display system, which will be an improved means to project a CRT to a comfortable viewing distance, such as, two to three feet distant from the observer, but not to infinity. The present invention will be of such design, as to have the focal length of the optical systems selected to magnify the CRT image, so that the apparent size of the CRT is larger at a three foot distance than the actual CRT appears to be at fourteen inches.

DESCRIPTION OF FIGURES

FIG. 1A is a diagrammatic side view shown in elevation, and illustrating how a CRT will re-image any and all light sources of the faceplate;

FIG. 1B is similar to FIG. 1A, but illustrates how the more usual convex shaped CRT re-images all external illumination sources, so that they appear to come from within the CRT and appear minified;

FIG. 1C is a side view shown in elevation and illustrates that no external sources of illumination can get into the display system of the invention, unless they originate at the level of the observer, but in such cases the observer himself blocks the source;

SUMMARY OF THE INVENTION

This display system avoids all of the disadvantages of available VDT's through the employment of an indirect viewing optical system. Systems of the prior art have been used to project scenes to great distances, normally referred to as optical infinity in training devices, such as visual simulators. These devices aid in producing realistic scenes, because they preserve real world angles and eliminate parallactic errors through the use of infinity projection. The present invention comprises an indirect viewing optical system for projecting a CRT to a comfortable viewing distance, such as, two to three feet distant from the observer, but not to infinity. In the present invention the focal length of the optical system is selected to magnify the CRT image so that the apparent size of the CRT is larger at a three foot distance, than the actual CRT appears to be at fourteen inches.

In the embodiment of the present invention the CRT electron radiation is dispersed not only because of the multiple reflections, where at each reflecting surface portions of the radiation are both absorbed and transmitted, therefore not reaching the observer by reflection, but because of the increased real distance between the observer and the CRT, the strength of the electron radiation is further reduced by the square of the distance ratio, i.e $$\left(\frac{14 \text{ inches}}{36 \text{ inches}}\right)^2 = 0.15.$$

DETAILED DESCRIPTION

Figure 2:
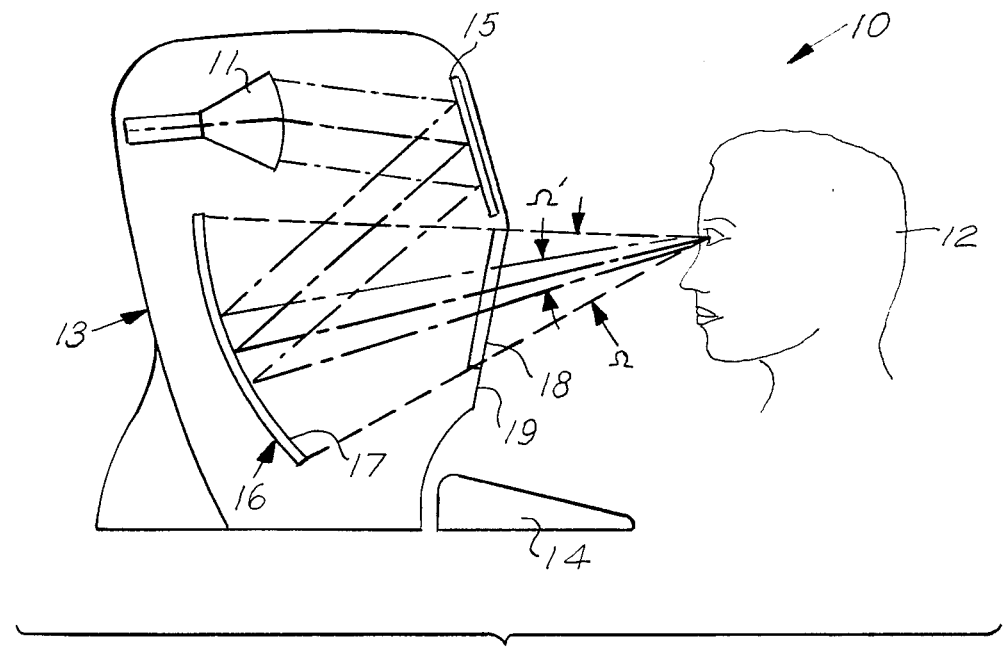
FIG. 2 is a diagrammatic side view of the preferred embodiment of the present invention.

Referring now to FIG. 2, a system 10 is shown to include a cathode ray tube 11 disposed above and forward of the observer 12 facing a computer housing 13 having a keyboard 14. Tube 11 is secured in the upper rear portion of housing 11, in a manner known in the art, and its image is reflected on the face of a plane mirror 15. Mirror 15 is suitably secured on the interior of housing 13 and cooperates with a spherical mirror 16 which is a focusing means and is also mounted in housing 13 to project the image of tube 11 off its arcuate concave surface 17 through an anti-reflection coated glass 18 in front of the observer 12. Glass 18 is similarly mounted as mirror 15, in the front portion 19 of housing 13, however, mirror 15 is spaced above glass 18 and is angularly disposed thereto. The resulting image projected appears to be at a distance from the observer 12, and the apparent distance of the projected image can be varied from two feet to infinity, by varying the distance of the cathode ray tube 11 to the spherical mirror 16. When the cathode ray tube 11 is at the focal plane of the spherical mirror 16, the focal plane defined as a distance of one half the radius of the spherical mirror 16, the image appears to be at infinity. By making this separation distance less than the focal length of the spherical mirror 16, the apparent distance of the cathode ray tube 11 is also less.

In the preferred embodiment, the apparent distance of the cathode ray tube 11 is adjusted to be approximately three feet for lessened fatigue in continuous viewing, and no further than three feet, so that re-accommodation of the observer's eyes from the tube 11 image to the computer keyboard 14 is comfortable.

It shall be noted, that system 10 packaged in housing 13, is designed to sit over the computer keyboard 14, and the observer's eye position is normally eight inches away from the coated cover glass 18 which encloses all components to maintain a dust-free environment. The housing 13 is painted a non-reflective black internally, for heightening the contrast of the tube 11 image with respect to the background, which will also prevent any internal reflection from producing stray light.

The preferred embodiment of the present invention will utilize a spherical mirror 16 rectangularly shaped in a three by four aspect ratio to suit the standard aspect ratio of commercially available cathode ray tubes. The spherical mirror 16 schematically shown, measures fifteen inches along the diagonal with sides of nine by twelve inches. The tube 11 measures nine inches along the diagonal with sides of five and four tenths by seven and two tenths, conforming to the three by four aspect ratio.

Referring particularly to FIG. 2, the magnification M of system 10 may be defined as:

$$M = \Omega/\Omega'$$

Whereas the angle subtended at the observer's eye by the spherical mirror 16 which is filled by the tube 11 image even though the apparent distance to 11 is further from the observer 12 than the spherical mirror, this is the angle that is subtended at the observer's eye by tube 11 at the true distance from the observer's eye, hence:

$$\Omega = \frac{\text{arc length}}{\text{radius}} = \frac{15 \text{ inch mirror diagonal}}{18 \text{ inch eye distance}} = 0.833 \text{ radian}$$

$$\Omega = 47.75°$$

$$\Omega' = \frac{\text{arc length}}{\text{radius}} = \frac{9 \text{ inch } CRT \text{ diagonal}}{36.75 \text{ inch eye distance}} = 0.245 \text{ radian}$$

$$\Omega' = 14.03°$$

and the magnification of the CRT apparent to the observer $$M = 47.75°/14.03° = 3.4 \text{ times}$$

Figure 3:
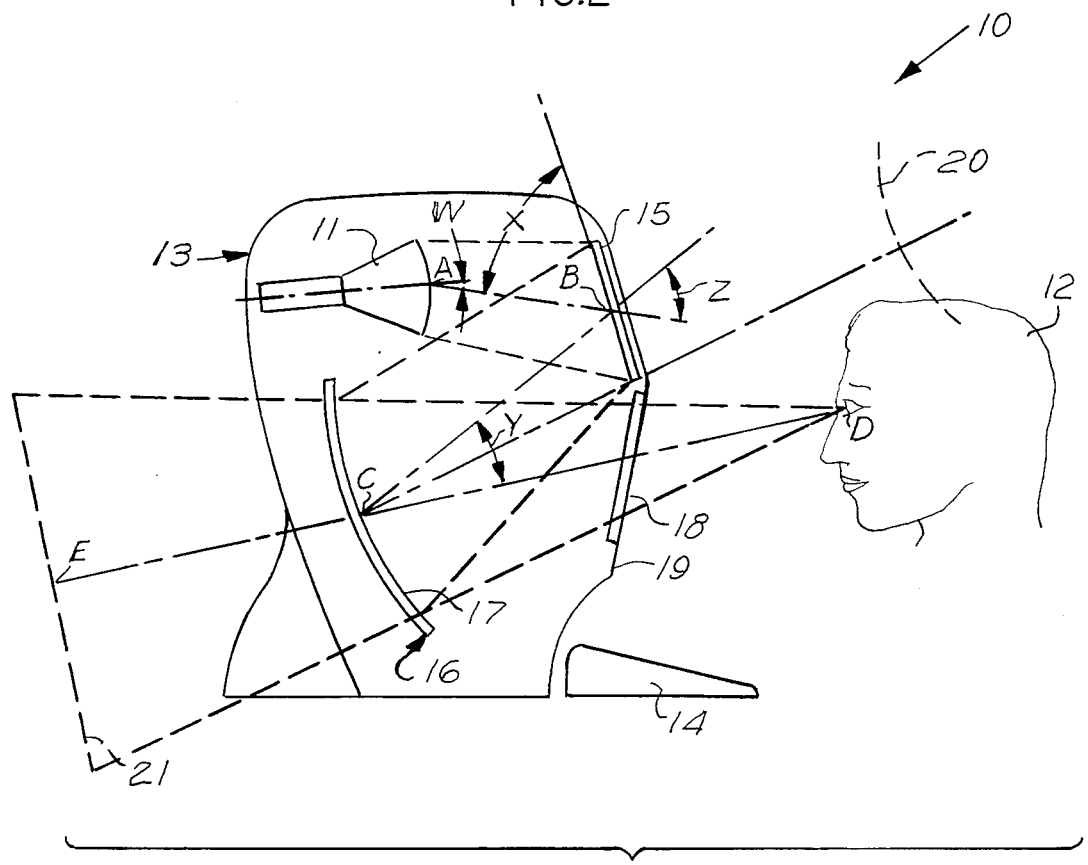
FIG. 3 is similar to FIG. 2, but illustrates the optical schematic of the invention.

Referring now to FIG. 3, the image on tube 11 is reflected by plane mirror 15 to a distance less than the focal surface 20 distance of spherical mirror 16, which then images the tube 11 in magnified form to the apparent position 21. The total distance of the tube 11 from the observer 12, is the sum of the distances from point A on tube 11 to point B on the plane mirror 15, to point C on the spherical mirror 16, and thence to point D at the observer's eye, the sum of these distances being approximately thirty six and three quarter inches. The apparent distance of the image position 21 is adjusted to a distance from point E to the observer's eye point D, which is approximately three feet by focussing the tube 11 along its longitudinal axis. The angles w, x, y, and z must be adjusted in accordance with all intermediate distances between mirrors 15 and 16, and tube 11. Further, angles w and z must be adjusted as well to provide an essentially rectangular image which is in good focus throughout its area. Manipulation of all of these angles will result in elimination of trapezoidal image distortion that would otherwise occur with off-axis projections.

It shall also be noted, that the cover glass 18 is inclined downwardly to further reduce the possibility of room objects and the observer 12 himself from being reflected back visibly. The computer keyboard 14 is shown in a preferred position, but may be located anywhere at the discretion of the operator.

In use, the observer 12 views the image reflected from the spherical mirror 16 which receives the image produced by tube 11 from the plane mirror 15

FIG. 1A illustrates how a modified tube 11a having a concave surface 22 will re-image any and all light, and a light bulb 23 is shown for an example.

FIG. 1B shows the more common tube 11b with a convex surface 24 that re-images all external light sources, causing them to appear to come from within the tube 11b and appear minified.

FIG. 1C is a side view showing, in elevation, that no external sources of illumination can get into the display system of the invention, unless they originate at the level of the observer, but in such cases the observer himself blocks the source. As illuminated, the system includes plane mirror 15, spherical mirror 16, surface 17, and anti-reflection coated glass 18 which allows the same to be used by an observer 12.

While various changes may be made in the detailed construction, such changes will be within the spirit and scope of the present invention, as defined by the appended claims.

What is claimed is:

1. A display system, comprising, a computer housing, a cathode ray tube positioned in said housing, a plane mirror secured in said housing, focusing means secured in said housing, for cooperation with said plane mirror to project and magnify an image produced by said cathode ray tube, for causing said image to appear a distance of approximately three feet from an observer and having a magnification of approximately three and a half times, and a cover glass secured in said housing for said observer to view said image, approximately six and a quarter inches being provided between said plane mirror and said cathode ray tube and approximately twelve and a half inches being provided between said plane mirror and said focusing means, said focuing means being a spherical mirror and including approximately a thirty six inch radius of curvature and cooperating with said plane mirror and said cathode ray tube to place said image said distance of approximately three feet from an observer.

2. The combination as set forth in claim 1, wherein said spherical mirror and said plane mirror cooperate with each other and reflect said image of said cathode ray tube to its normal left to right orientation without reversing said image on said cathode ray tube.

3. The combination as set forth in claim 2, wherein said cathode ray tube projects said image onto said plane mirror and said plane mirror reflects said image onto the arcuate concave surface of said spherical mirror, and said image is viewed by said observer through said cover glass that is secured in an opening provided in the front of said housing.

4. The combination as set forth in claim 3, wherein said cover glass is anti-reflection coated and is angularly inclined downward for further reducing the possibility of room objects and said observer himself being reflected back visibly, and all internal surfaces of said housing are blackened for eliminating stray reflections off of said cathode ray tube, and said cathode ray tube, said plane mirror, and said spherical mirror are fixed at angles in said housing that optically eliminate trapezoidal distortion as occurs in off-axis use of said spherical mirror.

* * * * *